(12) United States Patent
Guecker et al.

(10) Patent No.: US 11,029,404 B2
(45) Date of Patent: Jun. 8, 2021

(54) METHOD FOR CLASSIFYING OBSTACLES

(71) Applicant: Knorr-Bremse Systeme Fuer Nutzfahrzeuge GmbH, Munich (DE)

(72) Inventors: Ulrich Guecker, Schwieberdingen (DE); Falk Hecker, Markgroeningen (DE); Jan Mayer, Frieberg am Neckar (DE); Munir Kayalar, Schonaich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 1159 days.

(21) Appl. No.: 15/028,195

(22) PCT Filed: Oct. 16, 2014

(86) PCT No.: PCT/EP2014/072170
§ 371 (c)(1),
(2) Date: Apr. 8, 2016

(87) PCT Pub. No.: WO2015/055746
PCT Pub. Date: Apr. 23, 2015

(65) Prior Publication Data
US 2016/0252611 A1  Sep. 1, 2016

(30) Foreign Application Priority Data
Oct. 18, 2013 (DE) .................... 10 2013 017 347.7

(51) Int. Cl.
*G01S 13/931* (2020.01)
*G06K 9/00* (2006.01)
(Continued)

(52) U.S. Cl.
CPC .............. *G01S 13/931* (2013.01); *G01S 7/41* (2013.01); *G01S 7/411* (2013.01); *G01S 17/931* (2020.01);
(Continued)

(58) Field of Classification Search
CPC .......... G01S 13/931; G01S 7/41; G01S 7/411; G01S 17/936; G01S 2013/9321;
(Continued)

(56) References Cited

U.S. PATENT DOCUMENTS

| | | | | |
|---|---|---|---|---|
| 7,505,604 B2 * | 3/2009 | Zakrzewski | ....... | B64D 45/0015 382/100 |
| 7,729,510 B2 * | 6/2010 | Zakrzewski | ....... | G06K 9/00771 382/100 |

(Continued)

FOREIGN PATENT DOCUMENTS

| | | |
|---|---|---|
| CN | 102508246 A | 6/2012 |
| DE | 10 2005 024 716 | 12/2006 |
| DE | 10 2011 121560 | 6/2013 |

OTHER PUBLICATIONS

Chengzhi Yang et al. (A radar Signal Sorting algorithm based on shifting grids technique, Systems and Informatics (ICSAI), 2012 International Conference ON, IEEE, May 19, 2012, pp. 2371-2373, XP032193008, ISBN: 978-1-4673-0198-5).*

(Continued)

*Primary Examiner* — Vladimir Magloire
*Assistant Examiner* — Nuzhat Pervin
(74) *Attorney, Agent, or Firm* — Carter DeLuca & Farrell LLP

(57) ABSTRACT

A method is described for identifying and classifying objects, detected by a sensor apparatus which actively emits radiation, in terms of the relevance thereof to a driving situation of a moving vehicle, wherein radiation is emitted by the sensor apparatus and the echo radiation reflected at objects is received as measurement values, including: detecting measurement values in relation to the driving situation of the vehicle, performing an analysis of the (Continued)

driving situation represented by the measurement values and identifying at least one possible object, classifying the at least one identified object in an object class of a plurality of object classes, in which performing the analysis of the measurement values includes: transforming the detected measurement values from a coordinate system fixed in terms of the vehicle into a coordinate system fixed in terms of space for generating measurement values fixed in terms of spatial coordinates, wherein this transformation is based on the vehicle speed and the yaw rate of the vehicle in the determined driving situation, subdividing at least one total area, which is situated in the detection region of the sensor apparatus emitting radiation and which is coplanar or parallel with the roadway surface, into a plurality of partial areas, wherein partial areas adjoining one another partly overlap, determining the number and/or the statistical dispersion of the detected measurement values fixed in terms of spatial coordinates for each one of these partial areas, and in which performing the analysis of the driving situation represented by the measurement values and identifying at least one possible object includes: comparing the number and/or and statistical dispersion of the detected measurement values fixed in terms of spatial coordinates for each one of these partial areas, in each case with characteristic patterns, and identifying at least one object possibly present in a partial area and classifying the at least one identified object in an object class of a plurality of object classes depending on this comparison.

7 Claims, 2 Drawing Sheets

(51) Int. Cl.
G06K 9/20 (2006.01)
G01S 7/41 (2006.01)
G06K 9/46 (2006.01)
G01S 17/931 (2020.01)

(52) U.S. Cl.
CPC ..... *G06K 9/00214* (2013.01); *G06K 9/00805* (2013.01); *G06K 9/2027* (2013.01); *G06K 9/4647* (2013.01); *G01S 2013/9321* (2013.01); *G01S 2013/9325* (2013.01); *G01S 2013/93185* (2020.01)

(58) Field of Classification Search
CPC .... G01S 2013/9325; G01S 2013/9346; G06K 9/00214; G06K 9/00805; G06K 9/2027; G06K 9/4647
USPC ......................................................... 342/70
See application file for complete search history.

(56) References Cited

U.S. PATENT DOCUMENTS

| | | | | |
|---|---|---|---|---|
| 8,400,502 | B2* | 3/2013 | Zakrzewski | G06K 9/00771 348/122 |
| 8,542,106 | B2* | 9/2013 | Hilsebecher | G01S 13/931 340/435 |
| 8,605,947 | B2* | 12/2013 | Zhang | G08G 1/167 382/104 |
| 2003/0001771 | A1* | 1/2003 | Ono | G01S 7/411 342/70 |
| 2005/0069207 | A1* | 3/2005 | Zakrzewski | G06K 9/629 382/190 |
| 2005/0099332 | A1* | 5/2005 | Nakano | G01S 13/42 342/70 |
| 2008/0019567 | A1* | 1/2008 | Takagi | G06K 9/00369 382/103 |
| 2009/0016609 | A1* | 1/2009 | Zakrzewski | G08B 17/125 382/190 |
| 2009/0040367 | A1* | 2/2009 | Zakrzewski | G06K 9/629 348/370 |
| 2010/0052977 | A1* | 3/2010 | Sathyendra | G01S 7/411 342/25 F |
| 2010/0097200 | A1* | 4/2010 | Hilsebecher | G01S 7/412 340/436 |
| 2010/0104199 | A1* | 4/2010 | Zhang | G08G 1/165 382/199 |
| 2010/0321231 | A1* | 12/2010 | Nakahama | G01S 7/062 342/118 |
| 2011/0221628 | A1* | 9/2011 | Kamo | G01S 7/295 342/70 |
| 2013/0207834 | A1* | 8/2013 | Mizutani | G01S 7/411 342/70 |
| 2014/0292554 | A1* | 10/2014 | Smith | B60K 31/0008 342/27 |

OTHER PUBLICATIONS

Chengzhi Yang et al. (A radar Signal Sorting algorithm based on shifting grids technique, Systems and Informatics (ICSAI), 2012 International Conference ON, IEEE, May 19, 2012, pp. 2371-2373, XP032193008, ISBN: 978-1-4673-0198-5) (Year: 2012).*
Office Action and Search Report for corresponding Chinese Patent Application No. 2014-80057156.1 dated Mar. 15, 2017.
English Translation of European Patent Office, International Preliminary Report on Patentability dated Apr. 28, 2016, from International Patent Application No. PCT/EP2014/072170 filed on Oct. 16, 2014.
International Search Report for PCT/EP2014/072170, dated Jan. 19, 2015.
Chengzhi Yang et al., "A Radar Signal Sorting algorithm based on shifting grids technique", System and Informatics (ICSAE), 2012 International Conference on, IEE, May 19, 2012, pp. 2371-2373.

* cited by examiner

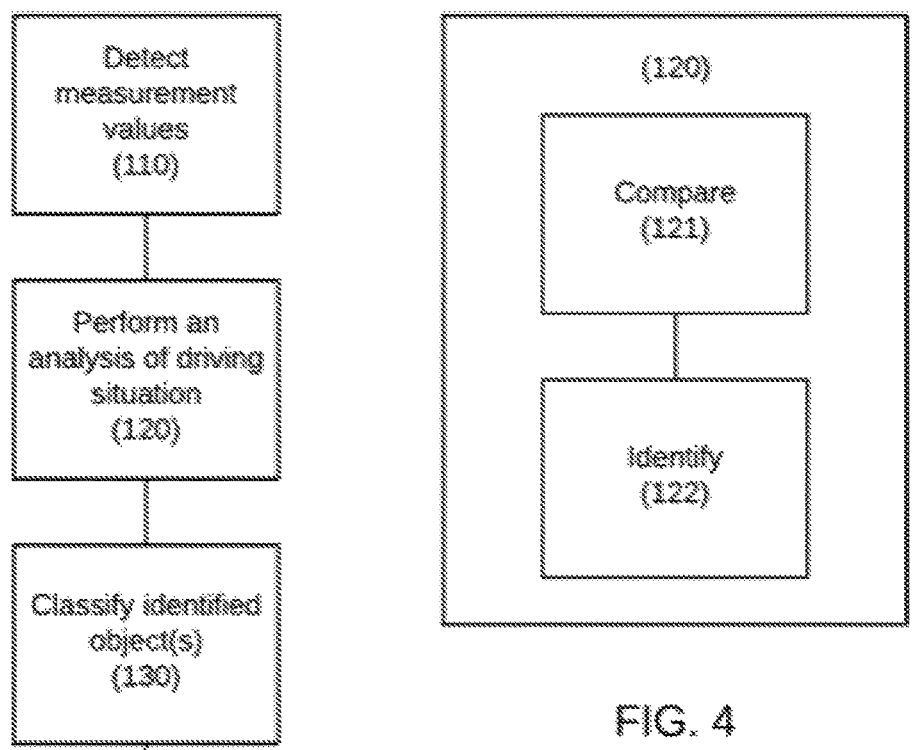
FIG. 4
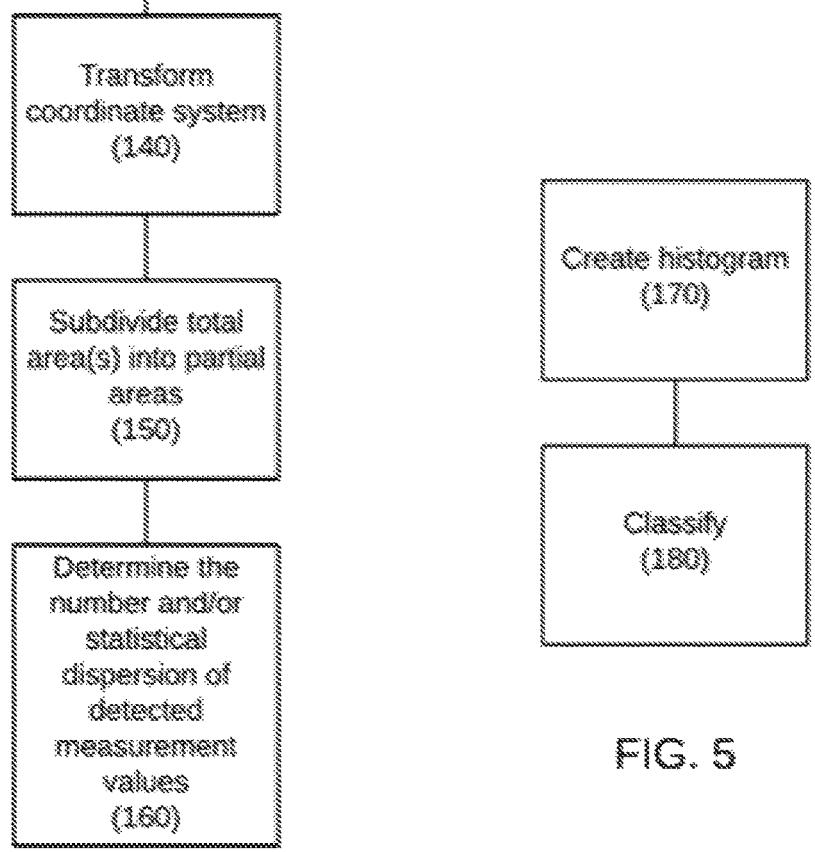
FIG. 3
FIG. 5

METHOD FOR CLASSIFYING OBSTACLES

FIELD OF THE INVENTION

The present invention relates to a method for identifying and classifying objects, detected by a sensor apparatus which actively emits radiation, in terms of the relevance thereof to a driving situation of a moving vehicle, wherein radiation is emitted by the sensor apparatus and the echo radiation reflected at objects is received as measurement values, containing the following tasks: detecting measurement values in relation to the driving situation of the moving vehicle, performing an analysis of the driving situation represented by the measurement values and identifying at least one possible object, and classifying the at least one identified object in an object class of a plurality of object classes of a vehicle.

BACKGROUND INFORMATION

Such a method and such a device are discussed in DE 10 2005 024 716 A1. In the method, the radiation reflected by the objects is compared, as measurement values, with stored characteristic values and it is evaluated. The class of the reflecting object is deduced on the basis of the evaluation.

Such methods may be used for adaptively controlling distance and speed of vehicles and/or for triggering an emergency brake, in which there is an intervention in the controller of the motor and of the brakes in a driving situation-dependent manner.

A speed predetermined by the vehicle driver is maintained in the case of speed feedback control systems. However, in the case of a relatively high traffic density all that is available to the vehicle driver is an intervention by actuating the brakes in order to react to slower-moving vehicles ahead or lane-changing vehicles. It is for this reason that there was further development of speed feedback control systems in which a sensor apparatus emits radiation and signals, which emerge from the echo radiation reflected at an object, for example in the form of a vehicle moving ahead, and received by the sensor apparatus, are evaluated in an evaluation apparatus in order to draw conclusions about the distance to the object and in order to intervene in the controller of the motor and/or of the brakes if a certain minimum distance is undershot. Such intelligent speed feedback control systems are also referred to as adaptive cruise control (ACC).

The sensor apparatus usually contains an infrared laser or a millimeter radar which scans the region in front of the vehicle within a radar or laser cone in order to identify objects situated therein and in order to determine the distance and speed of said objects in relation to the vehicle. The evaluation apparatus then deduces the relevance of the identified objects in respect of the trajectory of the vehicle and adjusts the distance of the vehicle from the identified object to a specific setpoint distance.

The radar or infrared sensor apparatuses from the prior art are able in this case to detect the distance, the relative speed and the azimuth angle of identified objects in relation to the trajectory of the vehicle because the assumption is made that the objects are situated in a plane parallel to, or in, the plane of the roadway. Such an assumption is justifiable for as long as a moving vehicle ahead is detected as an object.

However, such systems do not detect the angle of elevation between the plane in which the vehicle is moving (roadway or horizontal plane of the vehicle) and an object extending in the vertical direction at a certain distance therefrom, such as bridges, road sign gantries or tunnels. Previous adaptive speed feedback control systems therefore are flawed in relation to estimating the speed of an object having a relatively large elevation angle in relation to the vehicle. This problem is explained in detail in DE 10 2008 009 597 A1.

Therefore, a problem arising in the case of journeys under bridges where the elevation angle in relation to the own vehicle is relatively large is that errors when estimating the speed of such objects, which are not actually relevant to speed follow-up control, lead to errors in the identification and classification of the objects. As a consequence, bridges, road sign gantries, tunnels and also high-up road signs can then be identified and classified erroneously as relevant moving objects, which is why it is not possible to exclude the possibility of unwanted deceleration being introduced in front of, or when passing, such objects. In extreme cases, it may even be the case that an emergency brake is introduced on the open road, which is detrimental to traffic safety.

SUMMARY OF THE INVENTION

Compared thereto, an object of the invention consists of providing a method and a device of the type set forth at the outset in such a way that objects, in particular objects from a certain elevation angle, can be identified and classified with increased accuracy.

According to the invention, this object may be achieved by the features described herein.

The method according to the invention is based on the aspect of performing the analysis of the measurement values contains the following:

transforming the detected measurement values from a coordinate system fixed in terms of the vehicle into a coordinate system fixed in terms of space for the purposes of generating measurement values fixed in terms of spatial coordinates, wherein this transformation is based on the basis of the vehicle speed and the yaw rate of the vehicle in the determined driving situation, and subdividing at least one total area, which is situated in the detection region of the sensor apparatus which emits radiation and which is coplanar or parallel with the roadway surface, into a plurality of partial areas, wherein partial areas adjoining one another partly overlap, and determining the number and/or statistical dispersion of the detected measurement values fixed in terms of spatial coordinates for each one of these partial areas.

Performing the analysis of the driving situation represented by the measurement values and identifying at least one possible object contain the following:

comparing the number and/or and the statistical dispersion of the detected measurement values fixed in terms of spatial coordinates for each one of these partial areas, in each case with characteristic patterns, and identifying at least one object possibly present in a partial area and classifying the at least one identified object in an object class of a plurality of object classes depending on the comparison of the number and/or and statistical dispersion of the detected measurement values fixed in terms of spatial coordinates for each one of these partial areas, in each case with characteristic patterns.

In particular, the number and/or the statistical dispersion of the detected measurement values, fixed in terms of spatial coordinates, for each one of these partial areas are/is compared in this case with respectively one threshold and an object present in the relevant partial area is identified if the thresholds for the number and/or statistical dispersion are exceeded by the measurement values, fixed in terms of spatial coordinates, detected for the relevant partial area. Subsequently, the identified object is classified in an object class of a plurality of object classes, which may be likewise in a manner dependent on whether or not the number and/or the statistical dispersion of the measurement values, fixed in terms of spatial coordinates, detected for the relevant partial area have/has exceeded the assigned threshold in each case.

In other words, if a radar system is used as a sensor apparatus, the radar echo signals caused by reflections are transformed into a spatially fixed coordinate system and objects are identified and classified in a manner dependent on the properties thereof, in particular dependent on the frequency distribution (histogram) thereof in relation to the partial areas. By way of this method, it is possible to distinguish between objects which are moving and relevant to e.g. a speed follow-up control and objects which are not relevant and, in particular, it is possible to identify bridges, road sign gantries or tunnels. Ultimately, unwanted braking interventions by the speed follow-up control can be avoided as a result of the improved identification and classification.

Transforming the detected measurement values from a coordinate system fixed in terms of the vehicle into a coordinate system fixed in terms of space for the purposes of generating measurement values fixed in terms of spatial coordinates in this case harbors the advantage that objects such as bridges, road sign gantries or tunnels detected in a coordinate system fixed in terms of space can be distinguished better from moving objects such as vehicles.

Discrete regions are created by virtue of at least one total area, which is situated in the detection region of the sensor apparatus emitting radiation and which is coplanar or parallel with the roadway surface, being subdivided into a plurality of partial areas, with it being easier in each case to evaluate echo signals assigned to a partial area due to the restricted dimension thereof. Secondly, the partial overlap of partial areas adjoining one another avoids the case where an object is situated precisely at the joint of two non-overlapping partial areas and it is therefore not possible to uniquely detect said object. Therefore, a partial overlap should be understood to mean that adjoining partial areas overlap only in part but not as a whole. This partial overlap of the partial areas may be undertaken in the direction of travel of the vehicle or in the detection direction of the sensor apparatus.

The subsequent tasks, in which the number and/or the statistical dispersion of the detected measurement values, fixed in terms of spatial coordinates, for each one of these partial areas are/is compared with characteristic patterns in each case and at least one object possibly present in one of these partial areas is identified depending on the comparison of the number and/or the statistical dispersion of the detected measurement values, fixed in terms of spatial coordinates, for each of these partial areas with the characteristic patterns in each case and classified in an object class of a plurality of object classes, use statistical variables. The phrase "statistical dispersion" subsumes, in general, different statistical measures which describe the scatter of values, in this case measurement values of a frequency distribution (histogram), around a position parameter. The different measures in this case differ in terms of the sensitivity thereof in respect of outliers. By way of example, the variance or the standard deviation is a typical measure of this type. The pattern for such a statistical dispersion measure underlying the comparison is predetermined on the basis of characteristic empirical values. By way of example, in the case of a bridge, the measurement values in respect of the roadway width are distributed typically at a relatively large width and present with a greater density compared to the empty surroundings.

The number of measurement values, fixed in terms of spatial coordinates, detected in a partial area constitutes an alternative or additional criterion when identifying objects. By way of example, in the case of a bridge, the measurement values are present in a greater number in absolute terms compared to the empty surroundings.

Then, objects corresponding to the pattern of a moving vehicle ahead, for example, fall into the object class of relevant objects, with the relevance being given here in relation to a speed follow-up control such as ACC. By contrast, bridges, road sign gantries or tunnels fall into the object class of non-relevant objects because these objects should not cause a reaction during a speed follow-up control. However, the classification of the objects to object classes is arbitrary and can be undertaken as required by a person skilled in the art.

In the method according to the invention or the device according to the invention, it is also possible to identify and classify relevant objects situated in the region of a spatially fixed object such as a bridge. This is because a decision can be made on the basis of the statistical dispersion (shape or property of the histogram) of the lateral position of the measurement values as to whether a relevant object such as a vehicle moving ahead is driving under a bridge. Compared to a bridge, a relevant object such as a vehicle moving ahead constitutes a relatively concentrated object (point object). Therefore, the measurement values of a relevant object are scattered less strongly laterally, i.e. across the width, than in the case of a non-relevant bridge. This difference is identifiable on the basis of the shape or structure of the histogram.

The measures listed in the further descriptions herein render further advantageous developments and improvements of the invention specified herein.

Particularly, a histogram may be created for each one of the partial areas from the detected measurement values fixed in terms of spatial coordinates and an object possibly identified in a partial area is classified into an object class of a plurality of object classes depending on the histogram of the measurement values, detected for the respective partial area, fixed in terms of spatial coordinates.

Further measures improving the invention are presented in more detail below in the description of an exemplary embodiment of the invention and in the drawing.

An exemplary embodiment of the invention is depicted in the drawings below and explained in more detail in the subsequent description.

BRIEF DESCRIPTION OF THE DRAWINGS

FIGS. 3 to 5 show an exemplary embodiment of the method according to the invention.

DETAILED DESCRIPTION

Figure 1:
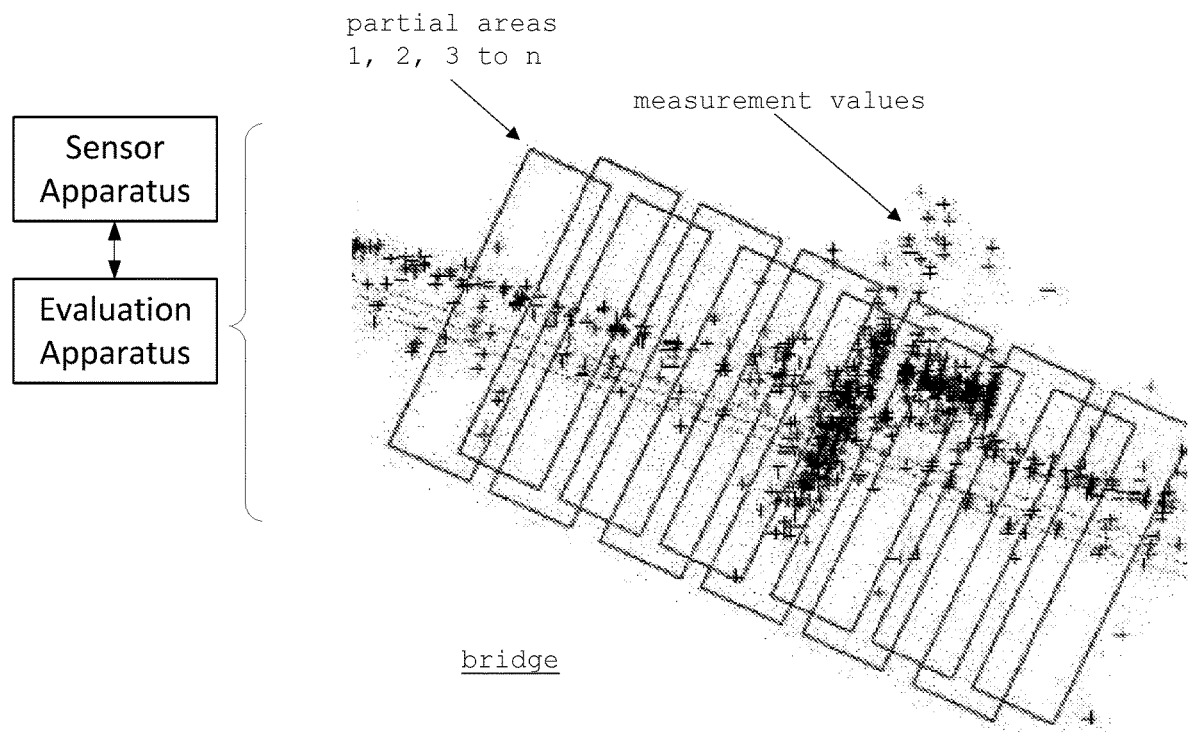
FIG. 1 shows an illustration of measurement values obtained by driving in the direction of a bridge and with the aid of an exemplary embodiment of the method or the device according to the invention, with an illustration of partial areas of a total area to be examined in respect of objects.

An exemplary embodiment of a method and a device for identifying and classifying objects, detected by a sensor apparatus which actively emits radiation, such as a sensor apparatus operating according to the laser principle or the radar principle and known per se, in terms of the relevance thereof to a specific driving situation of a moving vehicle is presented below.

By way of example, the sensor apparatus is a radar sensor apparatus, with radar radiation being emitted by the radar sensor apparatus and the radar echo radiation reflected by objects possibly present in the detection region of the radar radiation being received as measurement values.

The method, as shown in FIGS. 3 and 4, contains the following tasks:

- detecting measurement values in relation to the driving situation of the moving vehicle (110),
- performing an analysis of the driving situation represented by the measurement values and identifying at least one possible object (120), and
- classifying the at least one identified object in an object class of a plurality of object classes of a vehicle (130).

These tasks are realized as outlined below in accordance with the invention.

Initially, there is a transformation (140) of the detected measurement values from a coordinate system fixed in terms of the vehicle into a coordinate system fixed in terms of space for the purposes of generating measurement values fixed in terms of spatial coordinates, wherein this transformation is based on the basis of the vehicle speed and the yaw rate of the vehicle in the currently present driving situation.

Furthermore, a total area, which is situated in the detection region of the radar sensor apparatus and particularly in the detection region thereof and which is coplanar or parallel with the roadway surface, is subdivided (150) into a plurality of partial areas, wherein partial areas adjoining one another partly overlap. This procedure is elucidated in FIG. 1, in which, for example, the roadway situated in front of the moving vehicle in the direction of travel is subdivided into a plurality of partially overlapping partial areas 1, 2, 3 to n.

Thereupon, the number and the statistical dispersion of the detected measurement values, fixed in terms of spatial coordinates, are determined (160) for each one of these partial areas 1, 2, 3 to n with the aid of an evaluation apparatus of the device. In FIG. 1, the individual measurement values detected by the sensor apparatus are denoted by a cross in each case. The measurement values may be stored in a measurement value table, in which the respective partial areas are recorded in one direction and the number and statistical dispersion of the measurement values assigned to the respective partial area are recorded in the other direction.

In subsequent tasks, the number and the statistical dispersion of the detected measurement values, fixed in terms of spatial coordinates, for each one of these partial areas 1, 2, 3 to n are compared (121) in each case to characteristic patterns and at least one object possibly present in a partial area is identified (122) in a manner dependent on this comparison. The identified object is then classified in an object class of a plurality of object classes in a manner dependent on the comparison. To this end, i.e. for the identification and classification, use may be made of statistical variables such as the statistical dispersion.

For the statistical dispersion, the frequency distribution (histogram) of the detected measurement values may be used as statistical in this case. The pattern for the frequency distribution underlying the comparison is predetermined on the basis of characteristic empirical values. By way of example, in the case of a bridge, the measurement values in respect of the roadway width are distributed typically at a relatively large width and present with a greater density compared to the empty surroundings, which is reflected in a characteristic histogram as a characteristic pattern, as emerges from FIG. 1.

The number of measurement values, fixed in terms of spatial coordinates, detected in a partial area constitutes an additional criterion when identifying and classifying objects. By way of example, in the case of a bridge, the measurement values are present in a greater number in absolute terms compared to the empty surroundings. Therefore, if, for example, the number of measurement values detected in a partial area exceeds a predetermined threshold, this is an indication for the presence of a bridge in this partial area.

By way of example, in FIG. 1, the presence of a bridge in a partial area is deduced on the basis of a number and frequency distribution of measurement values, detected in this partial area, and the comparison with a characteristic number and frequency distribution, assigned to a bridge, in this partial area X.

It is also possible to use only a single criterion—statistical dispersion or a number of the detected measurement values—instead of both criteria—statistical dispersion and number of the detected measurement values.

By way of example, since the method or the device may be used for a speed follow-up control of a motor vehicle, objects corresponding to the pattern of a moving vehicle ahead or a vehicle swinging into the roadway fall into an object class of relevant objects. By contrast, bridges, road sign gantries or tunnels fall into the object class of non-relevant objects because these objects should not cause a reaction in a speed follow-up control.

Using the method according to the invention or the device according to the invention, it is also possible to identify and classify relevant objects situated in the region of a non-relevant object fixed in space, such as a bridge. This is because a decision can be made on the basis of the frequency distribution (histogram) of the lateral position of the measurement values as to whether a relevant object such as a vehicle moving ahead is driving under a bridge. A relevant object such as a vehicle driving ahead constitutes a relatively concentrated object (point object) compared to a bridge. Therefore, the measurement values of a relevant object are scattered less strongly laterally, i.e. across the width, than in the case of a non-relevant bridge. This difference is identifiable on the basis of the statistical dispersion, in this case in the form of the histogram.

Figure 2:
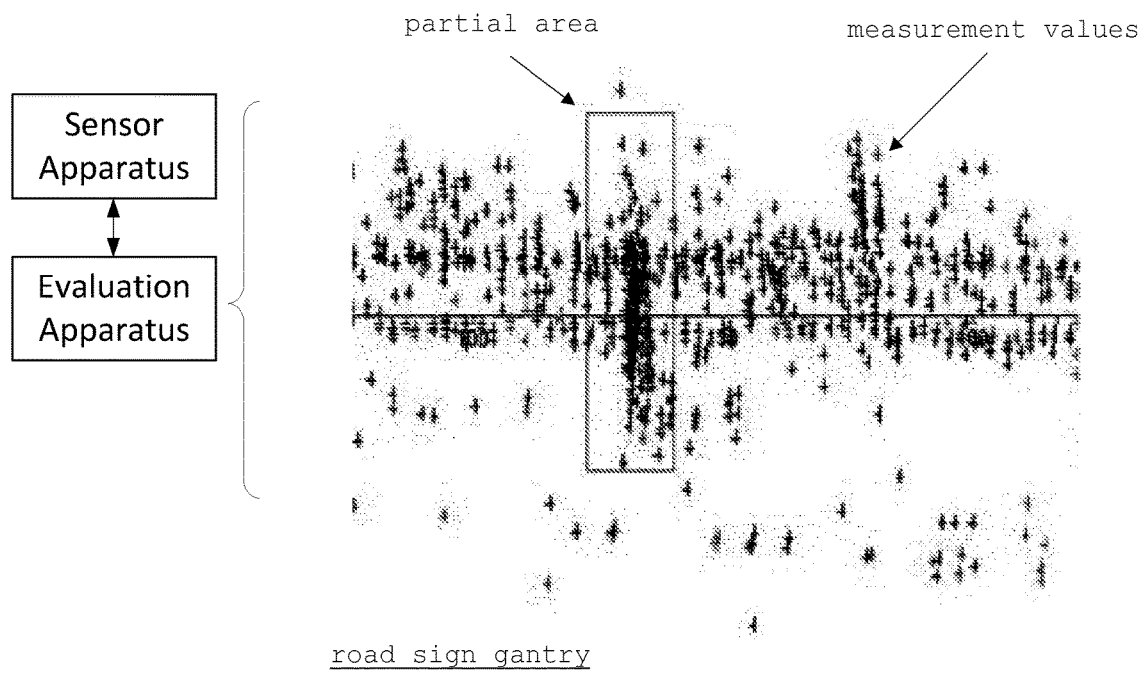
FIG. 2 shows an illustration of measurement values obtained by driving in the direction of a road sign gantry and with the aid of an exemplary embodiment of the method or the device according to the invention.

FIG. 2 shows a distribution of measurement values as were recorded when traveling toward a road sign gantry, i.e. a steel construction typically spanning a freeway, which carries displays or signs for displaying speed restrictions or traffic information.

As mentioned above, a histogram may be created (170) for each one of the partial areas from the detected measurement values fixed in terms of spatial coordinates and an object possibly identified in a partial area is classified (180) into an object class of a plurality of object classes depending on the histogram of the measurement values, detected for the respective partial area, fixed in terms of spatial coordinates.

The List of reference signs is as follows: 1, 2, 3, . . . n Partial areas

The invention claimed is:

1. A method for identifying and classifying objects, the method comprising:
   - detecting, via a sensor apparatus which actively emits radiation, in terms of the relevance thereof to a driving situation of a moving vehicle, wherein radiation is emitted by the sensor apparatus and echo radiation reflected at objects is received as measurement values, wherein the detecting includes detecting measurement values in relation to the driving situation of the moving vehicle;

performing an analysis of the driving situation represented by the measurement values and identifying at least one possible object; and classifying the at least one identified object in an object class of a plurality of object classes;

wherein the performing of the analysis of the measurement values includes:
  transforming the detected measurement values from a coordinate system fixed in terms of the vehicle into a coordinate system fixed in terms of space for the purposes of generating measurement values fixed in terms of spatial coordinates, wherein this transformation is based on the basis of the vehicle speed and the yaw rate of the vehicle in the determined driving situation,
  subdividing at least one total area, which is situated in the detection region of the sensor apparatus emitting radiation and which is coplanar or parallel with the roadway surface, into a plurality of partial areas, wherein partial areas adjoining one another partly overlap,
  determining a parameter of the detected measurement values fixed in terms of spatial coordinates for each one of these partial areas, and
wherein the performing of the analysis of the driving situation represented by the measurement values and identifying at least one possible object includes:
  comparing the parameter of the detected measurement values fixed in terms of spatial coordinates for each one of these partial areas, in each case with characteristic patterns, and
    identifying at least one object possibly present in a partial area and classifying the at least one identified object in an object class of a plurality of object classes depending on the comparison, wherein the at least one object is identified upon determining that the number of measurement values detected in a respective partial area exceeds a predetermined threshold; and
  wherein the parameter includes the number and/or statistical dispersion of the detected measurement values.

2. The method of claim 1, wherein a histogram is created for each one of the partial areas from the detected measurement values fixed in terms of spatial coordinates, and an object possibly identified in a partial area is classified into an object class of a plurality of object classes depending on the histogram of the measurement values, detected for the respective partial area, fixed in terms of spatial coordinates.

3. A device for identifying and classifying objects, comprising:
  a sensor apparatus, which actively emits radiation, to detect in terms of the relevance thereof to a particular driving situation of a moving vehicle, wherein the sensor apparatus is embodied to emit radiation and receive the echo radiation reflected at objects as measurement values;
  an evaluation apparatus for evaluating the measurement values detected by the sensor apparatus, the evaluation apparatus configured to perform the following:
    transforming the detected measurement values from a coordinate system fixed in terms of the vehicle into a coordinate system fixed in terms of space for the purposes of generating measurement values fixed in terms of spatial coordinates, wherein this transformation is based on the basis of the vehicle speed and the yaw rate of the vehicle in the determined driving situation,
    subdividing a total area, which is situated in the detection region of the sensor apparatus emitting radiation and which is coplanar or parallel with the roadway surface, into a plurality of partial areas, wherein partial areas adjoining one another partly overlap,
    determining the number and the statistical dispersion of the detected measurement values fixed in terms of spatial coordinates for each one of these partial areas,
    comparing the number and/or the statistical dispersion of the detected measurement values fixed in terms of spatial coordinates for each one of these partial areas, in each case with characteristic patterns, and
    identifying at least one object possibly present in a partial area and classifying the at least one identified object in an object class of a plurality of object classes depending on this comparison, wherein the at least one object is identified upon determining that the number of measurement values detected in a respective partial area exceeds a predetermined threshold.

4. The device of claim 3, wherein the evaluation apparatus is configured so that a histogram is created for each one of the partial areas from the detected measurement values fixed in terms of spatial coordinates and an object possibly identified in a partial area is classified into an object class of a plurality of object classes depending on the histogram of the measurement values, detected for the respective partial area, fixed in terms of spatial coordinates.

5. The device of claim 3, wherein the device is for controlling a speed of a motor vehicle.

6. The method of claim 1, wherein the method is for controlling a speed of a motor vehicle.

7. A method for identifying and classifying objects, the method comprising:
  detecting, via a sensor apparatus which actively emits radiation, in terms of the relevance thereof to a driving situation of a moving vehicle, wherein radiation is emitted by the sensor apparatus and echo radiation reflected at objects is received as measurement values, wherein the detecting includes detecting measurement values in relation to the driving situation of the moving vehicle;
  performing an analysis of the driving situation represented by the measurement values and identifying at least one possible object; and
  classifying the at least one identified object in an object class of a plurality of object classes;
  wherein the performing of the analysis of the measurement values includes:
    transforming the detected measurement values from a coordinate system fixed in terms of the vehicle into a coordinate system fixed in terms of space for the purposes of generating measurement values fixed in terms of spatial coordinates, wherein this transformation is based on the basis of the vehicle speed and the yaw rate of the vehicle in the determined driving situation,
    subdividing at least one total area, which is situated in the detection region of the sensor apparatus emitting radiation and which is coplanar or parallel with the roadway surface, into a plurality of partial areas, wherein partial areas adjoining one another partly overlap, determining the number and the statistical dispersion of the detected measurement values fixed in terms of spatial coordinates for each one of these partial areas, and wherein the performing of the analysis of the driving situation represented by the measurement values and identifying at least one possible object includes:

comparing the number and/or statistical dispersion of the detected measurement values fixed in terms of spatial coordinates for each one of these partial areas, in each case with characteristic patterns, and identifying at least one object possibly present in a partial area and classifying the at least one identified object in an object class of a plurality of object classes depending on the comparison, wherein the at least one object is identified upon determining that the number of measurement values detected in a respective partial area exceeds a predetermined threshold.

* * * * *